(12) United States Patent
Brunolli

(10) Patent No.: US 9,620,001 B2
(45) Date of Patent: Apr. 11, 2017

(54) REMOTE PHONE MANAGER

(75) Inventor: Michael J. Brunolli, Escondido, CA (US)

(73) Assignee: PRUNOLO, INC., San Diego, CA (US)

( * ) Notice: Subject to any disclaimer, the term of this patent is extended or adjusted under 35 U.S.C. 154(b) by 1532 days.

(21) Appl. No.: 12/876,846

(22) Filed: Sep. 7, 2010

(65) Prior Publication Data

US 2011/0059769 A1   Mar. 10, 2011

Related U.S. Application Data

(60) Provisional application No. 61/239,899, filed on Sep. 4, 2009.

(51) Int. Cl.
   *H04M 1/00* (2006.01)
   *G08C 17/02* (2006.01)
   *H04M 1/725* (2006.01)

(52) U.S. Cl.
   CPC .......... *G08C 17/02* (2013.01); *H04M 1/7253* (2013.01); *H04M 1/72563* (2013.01); *G08C 2201/93* (2013.01)

(58) Field of Classification Search
   CPC ... G08C 17/02; G08C 2200/00; H04W 4/008; H04W 4/02; H04W 4/021; H04W 4/20; H04W 84/18; H04W 4/005; H04W 8/005; H04W 4/08; H04W 4/16; G06Q 30/0261;
   (Continued)

(56) References Cited

U.S. PATENT DOCUMENTS 7,016,707 B2 * 3/2006 Fujisawa et al. ............ 455/567
7,103,367 B2 * 9/2006 Adams et al. ............ 455/456.2
7,257,398 B1   8/2007 Ukita et al.
(Continued)

FOREIGN PATENT DOCUMENTS

EP          1770976      4/2007
KR   10-2007-0059459     6/2007

OTHER PUBLICATIONS

Search Report issued Jan. 14, 2015 in corresponding EP 10814631.
International Search Report issued May 27, 2011 in corresponding PCT matter.

*Primary Examiner* — Olumide T Ajibade Akonai
(74) *Attorney, Agent, or Firm* — Foley & Lardner LLP; Mark J. Danielson

(57) ABSTRACT

According to certain aspects, the invention allows a person to manage some of the functions of a cell phone without having to actually have the phone in her hands. For example, the invention allows the user to know of the incoming call and further allows the user to send a user-specified message to the caller and/or otherwise manage how the call should be handled through a remote device. In certain embodiments, the invention is comprised of: a decorative watch-like or bracelet-like case; a decorative wrist band; a vibrating incoming call indicator; a partial or full face display; touch screen input capability, accelerometer for wrist flick input capability, and/or side buttons for user inputs; a Bluetooth antenna; a Bluetooth transmitter and receiver; a rechargeable battery; a connector or wireless charging element; a display/general purpose control unit with firmware; and standard Bluetooth link and application software on an associated cellular phone.

25 Claims, 8 Drawing Sheets

(58) Field of Classification Search
CPC ... G06Q 10/0833; H04M 1/7253; H04M 1/006;
H04M 1/72519; H04M 2250/02
USPC .............................. 455/41.1, 41.2, 418–420
See application file for complete search history.

(56) References Cited

U.S. PATENT DOCUMENTS

| | | | |
|---|---|---|---|
| 7,376,220 B2* | 5/2008 | Broussard et al. | 379/88.04 |
| 7,715,831 B2* | 5/2010 | Wakefield | G08B 13/1427 |
| | | | 455/418 |
| 8,090,364 B2* | 1/2012 | Delalat | 455/420 |
| 2002/0068556 A1* | 6/2002 | Brown | 455/420 |
| 2002/0115478 A1 | 8/2002 | Fujisawa et al. | |
| 2002/0198010 A1* | 12/2002 | Komsi et al. | 455/466 |
| 2005/0287981 A1* | 12/2005 | Hill | H04M 1/67 |
| | | | 455/404.1 |
| 2006/0135216 A1* | 6/2006 | Collavo et al. | 455/569.2 |
| 2007/0130274 A1 | 6/2007 | Lee et al. | |
| 2007/0218886 A1* | 9/2007 | Fujimoto et al. | 455/418 |
| 2007/0293206 A1* | 12/2007 | Lund | 455/415 |
| 2008/0233932 A1* | 9/2008 | Sapp | 455/415 |
| 2009/0051649 A1 | 2/2009 | Rondel et al. | |
| 2010/0223314 A1* | 9/2010 | Gadel et al. | 709/200 |

* cited by examiner

REMOTE PHONE MANAGER

CROSS-REFERENCE TO RELATED APPLICATIONS

The present application claims priority to U.S. Prov. Appln. No. 61/239,899 filed Sep. 4, 2009, the contents of which are incorporated herein by reference in their entirety.

FIELD OF THE INVENTION

The disclosed invention relates generally to an accessory for the cellular phone user. More specifically, the invention is a remote phone manager to be worn as an accessory and to manage a user's incoming calls and incoming text messages.

BACKGROUND OF THE INVENTION

Cellular phone use has become ubiquitous in the US and Europe. Use in developing nations is also exceptionally high. This is due the great utility of modern cell phones. They have improved greatly in size, weight, and battery life, while adding desirable features such as cameras, data storage, audio playback, video playback, text messaging and Internet access.

There came a point where cellular phones diminished in size such that they were too small for comfortable use of all the new features. Due to increased text use, larger or even full keyboards became desirable. Many users also wanted larger displays to better view pictures and video clips. These additional media uses put more energy demand on the battery. Thus to maintain required talk/standby time, phone manufactures have not been able to keep shrinking battery sizes, and in fact battery sizes have increased, especially in smart phones. Accordingly, contrary to previous trends, many types of cellular phones are trending toward getting bigger.

The result of the slight increases in cell phone size has been to derail the trend towards a more fashion-friendly phone format, such as a pendant or a wrist watch format (although some wrist watch phones such as those inspired by the "Dick Tracy" comic book have been proposed). It may still be possible to create a very basic phone in those formats. However, many consumers do not to give up the modern features. As a result, at least for many people, the cellular telephone remains an item that is not always held, pocketed or kept close. This creates a problem, for example, when women in that their cell phone is in a purse and/or not available for immediate access in many situations, such as when dining out, or moving about within a relatively confined area, such as when at home. A frequent occurrence for many people (men or women) is that their phone will ring while they are driving and they can't get to their phone before it goes to voice mail. Another common experience is that a personal phone will be at an employee's desk while he/she is consulting with someone a couple of cubicles away, he/she gets a call that he/she never hears and doesn't know about until he/she checks his/her phone, maybe hours later. Similar problems can occur when, for example, a phone is left in a backpack or briefcase or is otherwise not out of reach, or when a person is in a meeting and has the phone silenced or put away.

Therefore, there is a real need for a device that would provide users with the ability to have cellular phone ease of use even when the phone is not readily accessible.

SUMMARY OF THE INVENTION

According to certain aspects, the invention allows a person to manage some of the functions of a cell phone without having to actually have the phone in his/her hands. For example, the invention provides a solution for the "purse effect"—if a cell phone rings while buried in a purse or backpack, the user might not hear the ring and/or might need extra time to get to the phone to answer it. In such a situation, important calls might go unanswered until much later, or might get transferred to voice mail just a few seconds before the user can pick up the call. The invention allows the user to know of the incoming call and further allows the user to send a user-specified message to the caller—for example, the invention might instruct the phone to go off-hook and then play a message that says "Please don't hang up. I'll be with you in a moment."

In certain embodiments, the invention is comprised of: a decorative watch-like or bracelet-like case; a decorative wrist band; a vibrating incoming call indicator; a display that partially or fully occupies the face of the decorative case; touch screen input capability, accelerometer for wrist flick input capability, and/or side buttons for user inputs; a Bluetooth antenna; a Bluetooth transmitter and receiver; a rechargeable battery; a battery-charging element that can be hard-wired or wireless; a display/general purpose control unit with firmware; and standard Bluetooth link and application software on an associated cellular phone.

According to certain aspects, the application software on the phone in some embodiments is standard—such as using the Bluetooth hands-free profile or headset profile—to achieve some of the functions of the invention. In other embodiments the application software is custom-written and installed on the phone to eliminate dependence on the vagaries of how the standard profiles are embodied on different models of phone.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

[FIG. 5 is partially obscured]

DETAILED DESCRIPTION OF THE PREFERRED EMBODIMENTS

Figure 1:
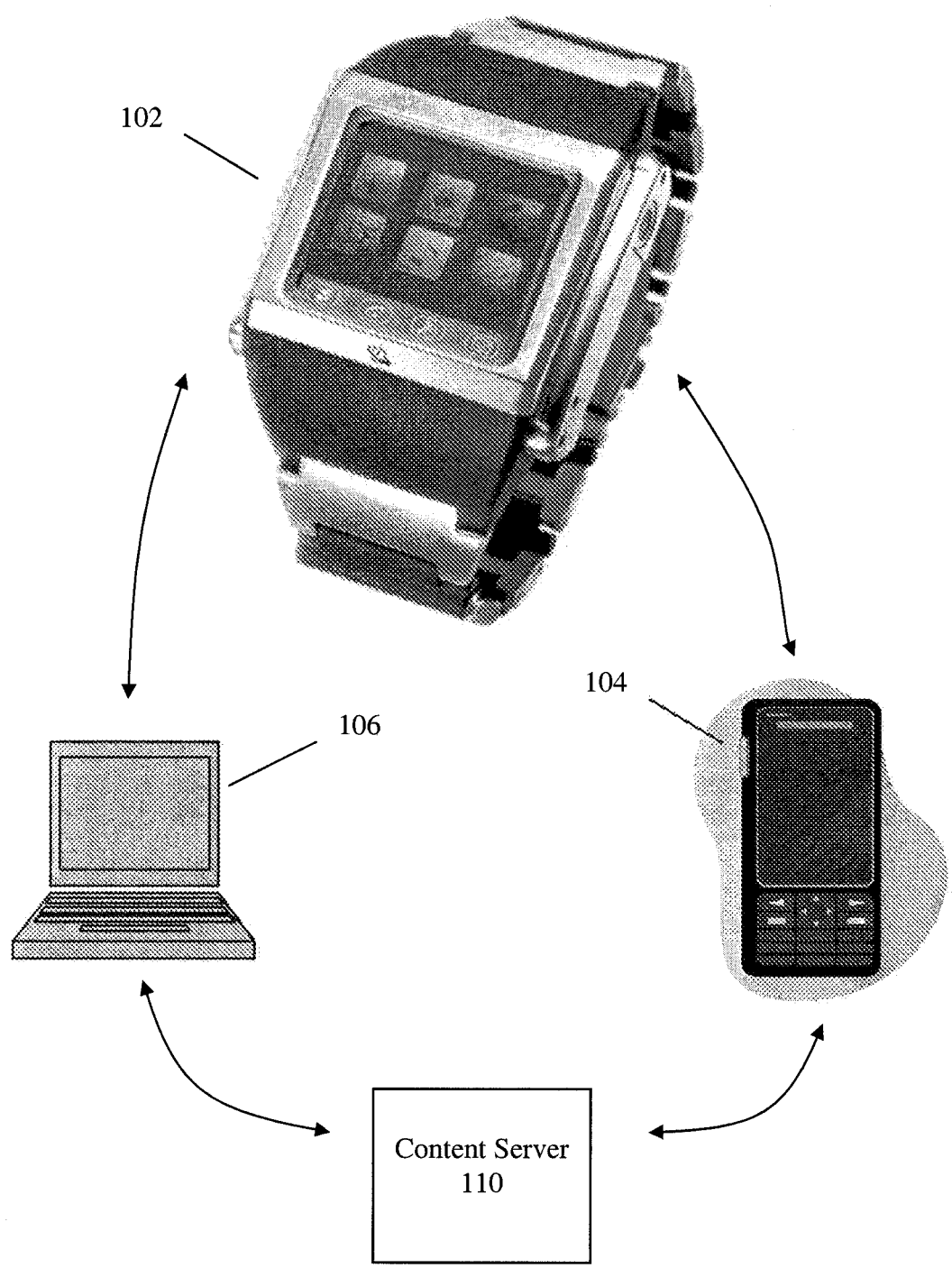
FIG. 1 illustrates broad aspects of the remote phone management invention in an example embodiment of a wrist mounted cellular phone accessory.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to certain embodiments of the invention, a device in the form of a personal accessory such as a watch, bracelet or pendant is provided that enables persons to manage calls and messages associated with a phone such as a cell phone. For example, when a call is made to the phone, information about the call (such as the phone number of the caller, the name of the caller, or the time/date of the call) can be displayed to the user and the invention presents options to the user for managing the call (e.g. answer, send to voice mail, send a hold message, etc.). The call/message management aspects of the device can be configured and/or customized for the user using software on a computing device such as a personal computer that can communicate with the device and perhaps also a publicly accessible server such as a web site with downloadable management software and/or content. In another embodiment, the device can be configured using software installed in the user's cell phone.

According to certain aspects, the invention allows a person to manage some or all of the call/message management functions of a cell phone without having to actually have the phone in her hands. In one non-limiting use example, the invention provides a solution for the "purse effect"—if a cell phone rings while buried in a purse or backpack, the user might not hear the ring and/or might need extra time to get to the phone to answer it. In such a situation, important calls might go unanswered until much later, or might get transferred to voice mail just a few seconds before the user can pick up the call. The invention allows the user to know of the incoming call and further allows the user to send a user-specified message to the caller—for example, the invention might instruct the phone to go off-hook and then play a message that says "Please don't hang up. I'll be with you in a moment." Additional features and functions of the invention will become apparent from the descriptions below. In general, however, an aspect of the invention is the ability to respond to phone events (primarily incoming calls and text messages) in situations where the user can't get to the phone or shouldn't talk on the phone.

FIG. 1 is a high-level system block diagram in accordance with embodiments of the invention.

As shown, the system includes a remote phone management device 102, in this example having a form factor similar to a wrist watch, a phone 104 that device 102 communicates with for call/message management, a computer 106 that communicates with device 102 to provide configuration and/or customization and also communicates with a content server 110 via the Internet, for example.

In some embodiments, the connection between computer 106 and device 102 includes USB that allows for "provisioning" of device 102 via computer 106, including loading operating parameters that can change the user interface (UI) and can change the modes of operation of the device. USB can also be used to charge a battery in device 102, as well as provide firmware updates to device 102. It should be noted that there can be other means of provisioning the device besides USB. Provisioning could be done via any wired or wireless connection that can transmit data. Moreover, battery charging can be done by any standard means that are well known in the art, as well as other means described in more detail below.

In some embodiments, the connection between phone 104 and device 102 includes Bluetooth, although many other standard or non-standard/proprietary protocols are possible, such as Zigbee, Wireless USB, UWB or Bluetooth LE. In general operation, phone 104 sends notification of events (such as an incoming call) to device 102. Device 102 sends commands and data for managing such events.

Computer 106 can download set-up software from server 110. Such set-up software can include functionality to provision device 102, download firmware upgrades, perform system resets, etc. If computer 106 has a microphone or headset, a user can record custom sound files without using phone 104. Additionally or alternatively, a user can record custom sound files by dialing a special number using phone 104 and then speaking into the phone. Messages can then be stored on server 110. As will become more apparent from the descriptions below, server 110 can be the source of the latest version of the set-up software. It can also be the source of any firmware upgrades and any new releases of the phone apps. It can also be the repository or library of fonts, icons, pre-recorded messages (e.g. in celebrity voices), pre-canned text responses and other data that can be used to provision device 102.

When the user uses the phone 104 to record new audio files (by calling a special number), the audio files must be uploaded to the server 110 first when there is no direct link between the user's phone 104 and the PC 106. The files are then downloaded later from server 110 to the user's PC 106. Additionally or alternatively, it is possible to have a set-up app that resides on the user's phone 104. With this app, the user can set the provisioning data (including recording audio files) on the phone 104, then provision device 102 directly using a Bluetooth connection (or any other data link that can be made between phone 104 and device 102).

Phone 104 is a cellular phone or any other similar type of mobile phone (e.g. satellite phone). It can be a smart phone (e.g. iPhone, Android, Blackberry, etc.) or it can be a basic "feature phone", for example. Some of the inventions of the device can be implemented using Bluetooth headset and/or hands-free profiles, or the phone can be adapted to operate with device 102 as described in more detail below.

Computer 106 is a laptop, desktop, notebook, and/or notepad computer such as those developed for use with Windows, Apple OS, Linux and other operating systems and preferably having Internet connectivity (e.g. a web browser) and USB capability. Or it can be any computing device capable of setting up the provisioning data for the invention and then downloading the provisioning data to the invention.

Device 102 can be implemented in many ways and in various form factors including in a form factor similar to a wrist watch. A general aspect is that it is comfortable to wear or carry and readily accessible for use. In some embodiments, the face of the "watch" is a color display with a touch pad overlaying the display. It should be noted that device 102 is not necessarily a standalone device. For example, one or more elements of device 102 could be incorporated in other personal devices such as an MP3 music player.

Server 110 is a server that preferably is publicly accessible via the Internet and an associated web server. It preferably includes databases for firmware upgrades for device 102, new apps for phone 104, device 102 provisioning (e.g. icons, messages, audio files, etc.) as mentioned above. In other embodiments, server 110 is any network attached storage device with some management software that allows it to manage the storage of and access to the items stored on the server. Other aspects and features of server 110 will become apparent from the following descriptions regarding use and configuration of device 102.

It should be noted that the invention can be practiced with fewer or more components than shown in FIG. 1. For example, it is not necessary to have a computer and/or server in some embodiments. Moreover, phone 104 can communicate with other devices such as other Bluetooth devices (e.g. Bluetooth headset).

Figure 2:
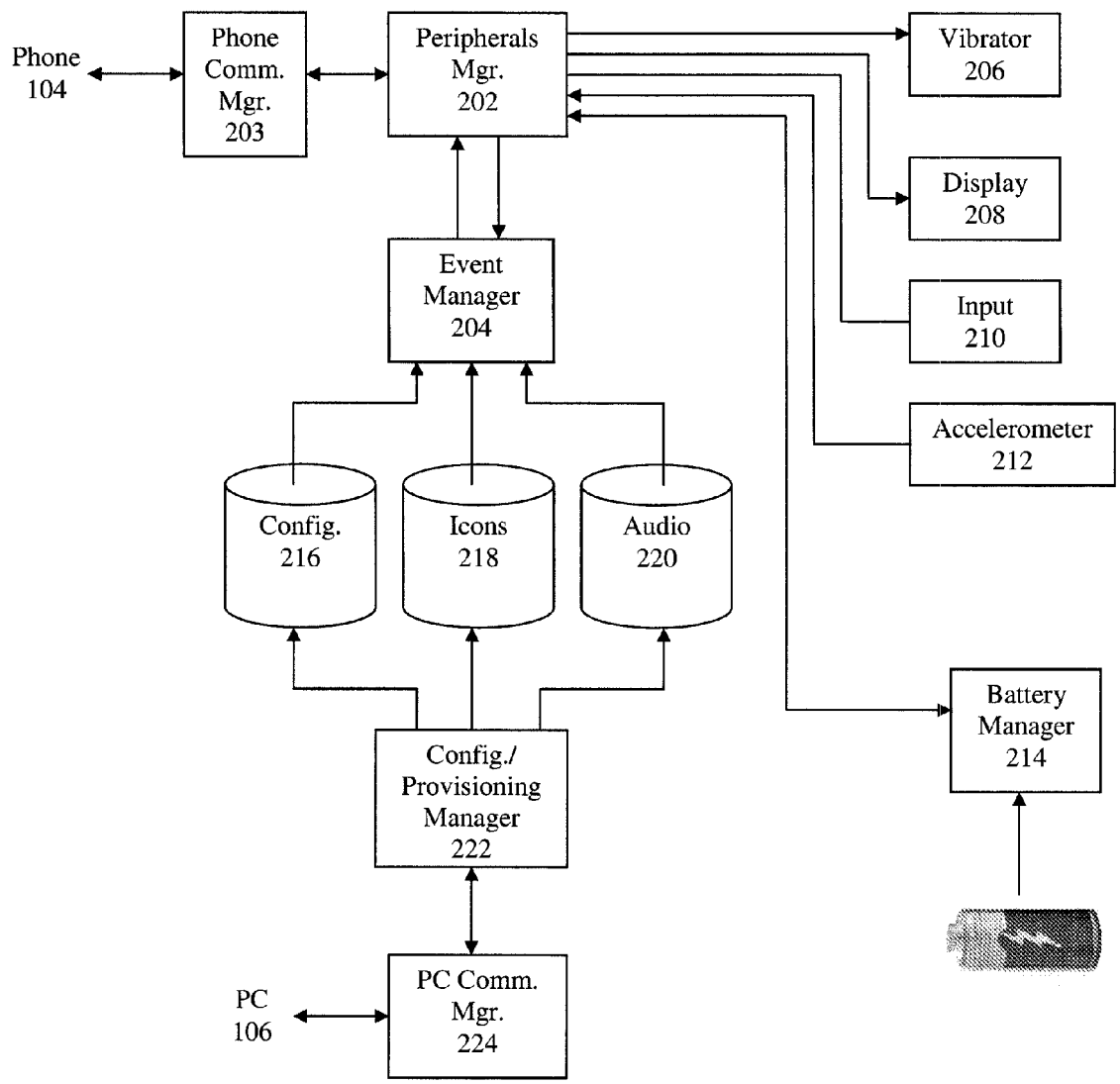
FIG. 2 is a functional block diagram of an example remote phone management device according to embodiments of the invention.

FIG. 2 is a functional block diagram of an example device 102 according to embodiments of the invention. The elements depicted in the block diagram can be implemented using hardware, software, firmware and combinations thereof as will become apparent to those skilled in the art.

As shown in FIG. 2, device 102 includes a phone communications manager 203 and a PC communication manager 224 that manages communications with a phone 104 (among other things) and PC 106, respectively. An event manager 204 responds to events reported by phone communications manager 203 and/or peripherals manager 202 (e.g. incoming call) with responses and commands (e.g. send call to voice mail).

To manage responses to events, event manager 204 accesses information in configurations 216, icons 218 and audio 220. Configurations 216 stores default and/or customized settings for interacting with users to determine how to respond to events. Icons 218 stores default and/or customized text, icons, GUI images, etc. to be displayed to a user in connection with managing events. Audio files 220 stores default and/or customized audio files for use in managing events (e.g. personalized greeting when a call is received). It should be noted that in a preferred embodiment, the provisioning data are stored in the device 102. But in other embodiments, some of the provisioning or all of the data can be stored in the phone 104. The most likely candidates to be stored in the phone are the audio files and the custom text messages.

Event manager 204 also communicates with one or more hardware components in device 102 (perhaps via peripherals manager 202) such as vibrator/buzzer 206, display 208, input 210 (e.g. transparent touchpad overlaying display 208, or buttons/switches), and accelerometer 212. In general, event manager 204 communicates with these components (perhaps via peripherals manager 202) to manage a user interface for interacting with a user to manage events, as will be described in more detail below.

In one example, display 208 has an active area of about 20×20 mm (0.8"×0.8"). In another example, display has an active area of about 26×20 mm (1"×0.8"). In embodiments, an OLED is used for the display. In other embodiments, a backlit LCD is used. Many variations of display technologies, sizes, designs, styles and features are possible while remaining within the spirit of the invention.

In some embodiments, the default display presented on display 208 resembles a traditional watch face. Device 102 can get the time and date from the phone 104 and display it in a display similar to an analog or digital watch. There is also preferably an option for setting time and date manually, for example, if the device 102 is not paired with a phone 104.

As set forth above, one aspect of the invention is to allow remote phone management when a user is busy (at a meeting, or driving, or carrying a baby and groceries, etc.) and/or is preoccupied. Accordingly, the user interface (UI) for the device 102 managed by event manager 204 preferably requires the least possible action and the least possible thought by the user. The possibility of the user initiating an unintended action is further preferably minimized. In embodiments, event manager 204 manages a "flick & click" user interface. For example, the user can "flick" her wrist or swipe the display to flip through a sequence of options that the user can select to trigger actions that are applicable to the current state. The user can then "click"—i.e. tap on the display to select the currently displayed option. In other embodiments, there can be one or more pushbuttons on the phone for click input alternatively or in addition to tapping the display or for performing other user inputs. Various other alternative input methods to the accelerometer and the touchpad should become apparent to those skilled in the art after being taught by the present invention, including but not limited to scroll buttons somewhere on the body of the device, voice input, etc.

Accordingly, in a preferred embodiment event manager 204 communicates with accelerometer 212 to detect wrist motion and process it as user input. For example, the accelerometer can detect a wrist flick, which is used by event manager 204 to output to the display 208 a sequence options that are presented to the user. Another use of accelerometer data is to provide 3D displays. In other words, event manager 204 can change the appearance of the display as the user moves her wrist, giving a 3D or parallax appearance to the displays, with some images appearing to be in the foreground and some appearing to be in the background or with images on the display appearing to rotate or present different aspects or surfaces to the user in response to movements of the device. Communications with accelerometer 212 (via peripherals manager 202) can also include information regarding movement of device 102, for example, to transition to a wake state from a sleep state of device 102, which information can be further relayed to event manager 204. For example, event manager 204 can look for a specific acceleration signature such as a wrist flick to trigger a wake-up. Those skilled in the art will understand how to implement detection of an acceleration signature from accelerometer data associated with movement such as a wrist flick (when the device is worn on the wrist) or similar predetermined types of movement (e.g. hand-held shake).

In general, event manager 204 presents text and/or icons on display 208 using data from store 218 to inform the user of the current state or option for the user to select.

Event manager 204 communicates with vibrator 206 to notify the user of an event that requires user action or input. In one possible example, a simple pulse is used. In another possible example, the vibrator starts slowly and ramps up until the user responds. It should be noted that in this embodiment, there are no audible indications to the user— i.e. no speakers or beepers. However, audible indications are possible in other embodiments.

In embodiments, event manager 204 also communicates with peripherals manager 202 and/or phone communications manager 203 to receive Bluetooth RSSI information. This can be used to warn the user if she might be losing her phone. If signal strength from the phone drops below a threshold, then event manager 204 can cause the vibrator 206 and/or display a message to warn the user that she might be losing her phone. As appreciated by those skilled in the art, Bluetooth has sophisticated protocols for managing signal strength. In some example implementations, after the user gets the "Leaving Phone Behind" warning, she has at least the following options: Make the phone ring—the default option, to help the user find the phone; ignore weak BT signal for a default period of time or for a period of time that the user specifies.

Depending on the action selected by the user, and to get information regarding an incoming call and/or message, event manager 204 interacts with peripherals manager 202 and/or phone communications manager 203 to handle a call or message. When the communication protocol is Bluetooth, this can be done with many existing Bluetooth functions such as those included in the Bluetooth hands-free profile, headset profile, serial port profile, etc. For example, to play a message that asks a caller to hold briefly until the user can get to the phone, event manager 204, phone communications manager 203 and/or peripherals manager 202 can use Bluetooth profiles to take the phone 104 off hook, and then play an audio file (e.g. "Please hold, I'll be right there") through the microphone channel supported by the hands-free profile. Those skilled in the art will recognize how to implement the features and functionalities of the invention by adapting well-known Bluetooth and other similar protocols after being taught by the present disclosure.

Although those skilled in the art of Bluetooth protocols and profiles will be adequately taught by the present disclosure, it should be noted that the present invention uses the standard hands-free or headset profile in new and useful ways. Those profiles are designed to take analog audio files from a microphone and send them to the phone, and thence to the calling party. In one embodiment of the device 102 according to the invention, there will be no microphone. The audio files are pre-recorded and stored in digital format. When it is necessary to play an audio file to the calling party, a SCO channel is opened (which is the channel that audio from the microphone is sent to) and the device sends the audio files directly to the SCO. This can be done in various ways. One is to convert the digital audio files to analog, and inject the analog files into the SCO channel, which then converts them back to digital in a format that is standard to BT. This is route is simple, but is processor intensive. Some Bluetooth chips provide the ability to send the digitized audio file directly to the chip without going through back-to-back D-to-A and then A-to-D conversions. There are several ways of doing the direct digital transmission of audio files, as will be apparent to those skilled in the art.

As shown, PC communication manager 224 communicates with configuration manager (i.e. Provisioning Manager) 222. For example, configuration/provisioning manager 222 receives communications from PC 106 regarding default and/or customized settings to store in configurations 216, icons 218 and audio 220. Audio files can be in any standard digitized audio file format—there are hundreds of known standards. MP3 in some embodiments. WAV is another alternative. Icons and images can be in many different file formats—bitmap, JPG, TIFF, etc. The pre-canned text messages will be in ASCII standard formats—using the ASCII standard for the language in which the device is localized. Other provisioning data will be in text and/or custom instruction formats. In embodiments, data for configurations 216, icons 218 and audio 220 are stored in Flash or EEPROM or SRAM. Preferred storage location is non-volatile memory.

In embodiments of the invention, the user can configure some or all of the following UI features: select the set of options (responses to incoming calls) that will be presented to the user; select the icon associated with each option (e.g. associating downloaded icons/images with specific responses to incoming calls); select text that will be displayed with each icon (as reminder of the icon's function); select the order in which the icons are displayed; record custom audio messages associated with the options that play a message; and prepare custom text messages that can be sent using the text response feature. Additionally, the user preferably can choose to have the display show icons/images only, or text only, or both icons and text. In some embodiments, the user can select whether the time is displayed in analog or digital formats, and can select or change the appearance of the time and date displays. For example, the user can change the background color or image, the color and style of fonts, the style of the watch hands, etc.

In the embodiment illustrated in FIG. 2, the user customizes the UI using personal computer 106 using set-up software (i.e. provisioning software) running on PC 106. The customizations are then communicated to device 102 using a USB connection (e.g. USB Type A connector on PC 106 and mini- or micro USB or other standard or custom USB connector on device 102). PC communication manager 224 handles the configuration communications with PC 106, and relays them to configuration manager 222, which handles updates to stores data in locations 216, 218 and 220 as appropriate.

It should be noted that certain or all of the above configurations can additionally or alternatively be made using an application running on phone 104 (e.g. using a mobile version of the application for PC 106 that is installed on the phone 104). It should be further noted that configurations can be communicated from either PC 106 or phone 104 using other means besides USB connections, for example using Bluetooth. In general, it should be possible to use any communication channel that allows transmission of data. There are existing alternatives to USB or Bluetooth, such as RS-232 or Ethernet or FireWire (for wired connections). However, other existing and future alternatives are possible, and could be used with the invention. For example, when Bluetooth LE starts gaining critical mass in the market, it will replace the current Bluetooth as the dominant wireless protocol between cell phones and accessories. Alternative wireless connections could be Zigbee (which no current phones use, but which is the basis of Bluetooth LE), or future wireless communication protocols that might become standard in cell phones.

It should be noted that device 102 also preferably supports firmware upgrades, for example done over the same USB connection used for configurations, with power coming from the host (computer) USB port to assure that there is not a loss of battery power during a firmware install. Another possible means of firmware upgrades is via a wireless link, such as Bluetooth, from either the PC or the phone, or some other computing device capable of downloading firmware. Additionally an application running on phone 104 could provide an API (application programming interface) so that other applications running on 104 could use 102 as a remote input and output device.

As further shown, device 102 includes battery manager 214 that is coupled to communicate with battery 226 and peripherals manager 204. Communications with battery 226 can include information regarding battery charge state, which information can also be related to event manager 204. For example, event manager 204 can notify a user of low battery state, and force the device into low power mode if the battery charge drops below a certain threshold.

As mentioned above in connection with FIG. 1, in some embodiments a conventional phone 104 or other device is adapted for operation in accordance with the invention.

Figure 3:
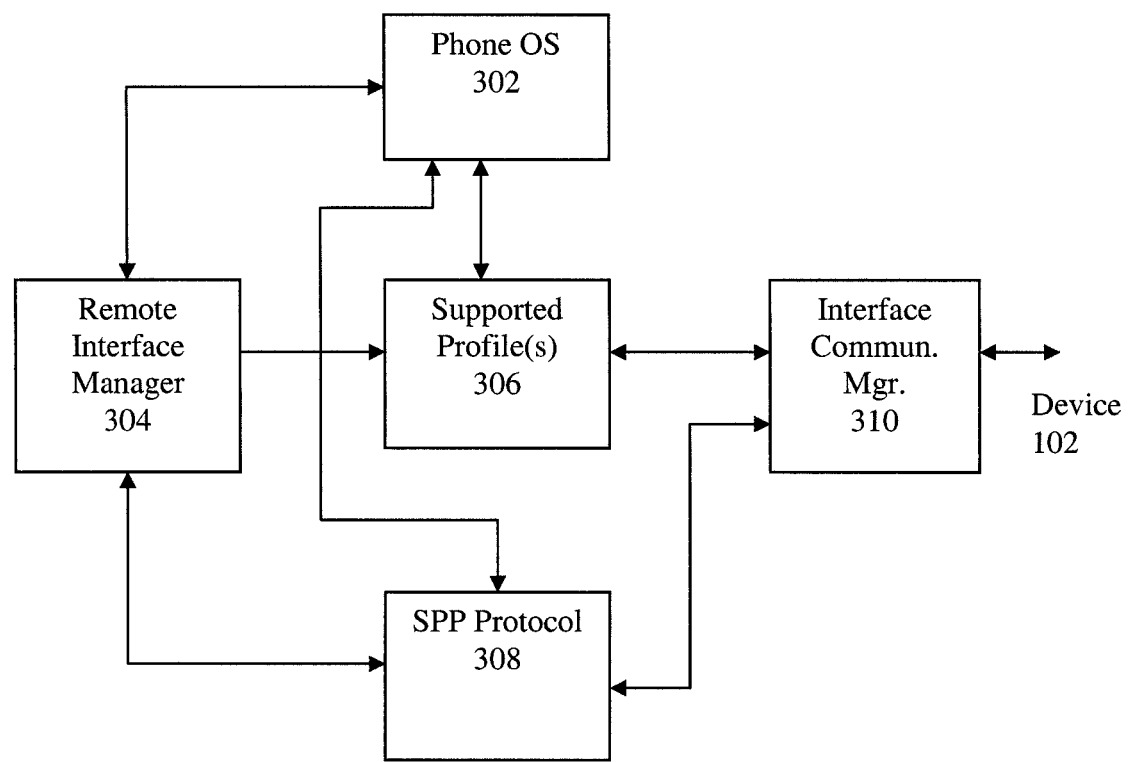
FIG. 3 is a functional block diagram of an example phone adapted for use with a remote phone management device according to embodiments of the invention.

A functional block diagram of a phone 104 adapted for use in accordance with the invention is provided in FIG. 3.

As shown in FIG. 3, phone 104 includes an operating system 302, a remote interface manager 304, supported profiles 306, Serial Port Protocol (SPP) protocol 308 and interface communication manager 310. In embodiments, operating system 302, supported profiles 306 and interface communication manager 310 are native elements of phone 104. For example, where phone 104 is a device such as an iPhone, operating system 302 is the iPhone OS, interface communication manager 310 is a native Bluetooth interface, and supported profiles 306 are Bluetooth profiles supported by the iPhone. Technical details and specifications regarding Bluetooth profiles that can be adapted and/or used in accordance with the invention such as the Hands-Free Profile, the Headset Profile, and the Serial Port Profile can be found at www.bluetooth.org. Those skilled in the art will understand how to user or adapt such profiles for use with the invention after being taught by the present disclosure.

SPP protocol 308 includes profiles for communicating with device 102 that are not supported by a native phone 104. In this regard, it should be noted that every model of phone has a different set of Bluetooth profiles that it supports. And it's very common for phone manufacturers to modify the Bluetooth standard profiles to fit their needs or requirements. For example, a phone may be advertised as supporting the HFP, but it may only support a subset of the features of the HFP. And one manufacturer might use different implementations of the HFP (or other profiles) in different models of phones that they make. This is where a phone app according to the invention (i.e. remote interface manager 304) comes in.

In some embodiments, the invention makes use of as many features as possible that are native to each model of phone, and to develop a phone app for each model that enables features of the invention that aren't supported by native software in the phone. This approach minimizes the size of each Phone App and the development effort to write the Phone App.

In other embodiments, Phone Apps are provided that do everything and don't utilize any of the native software or profiles in the phone. This approach reduces the risk of phone manufacturers releasing software upgrades that change how they implement Bluetooth communications—which could render some of features non-functional until a software update can be released. But it requires a bigger Phone App and more development effort.

A preferred embodiment can take a middle path. This embodiment relies on subsets of the standard profiles (mainly HFP) that are implemented on a nearly universal basis. This reduces exposure to adverse effects of software updates to the phone OS. The Phone App will likely be not too big and not too small.

In this regard, it should be noted that SPP profile 308 is illustrated in FIG. 3 because it provides a convenient, standard profile to send data back and forth via Bluetooth. In some respects, it provides the least common denominator for Bluetooth communications. And instructions or data that don't fit into the other profiles (mainly HFP or HSP, secondarily PBAP which is Phone Book Access Profile), will probably be sent using SPP. Custom communication protocol(s) could also be developed, but since SPP is cheap and nearly universal, it is possible to use that for any communications that aren't handed by the other higher-level profiles.

Remote interface manager 304 is an application (i.e. Phone App) that may be downloaded onto phone 104 and includes functionality that is necessary for allowing phone 104 to support the call and event management operations of device 102. For example, it includes support for any functions or features of the invention/device 102 that are not supported by profiles and software native to the phone. Some examples are sending text messages between phone and device 102, or using the called ID to look up names in the phone's address book. (Some phones support the PBAP, but many don't, in which case the remote interface manager 304 can be used to look up names on those phones.) It is also possible to use the remote interface manager 304 to capture alarms and calendar event notifications from the phone and send them to the device 102. In a preferred embodiment, remote interface manager 304 is a software application that can be downloaded to phone 104 in a variety of conventional ways known for downloading applications to cellular phones such as iPhone and Android apps. For example, the download can be done via existing and/or publicly accessible websites such the iPhone store or the Android store or the Blackberry store, etc., as is well understood by those skilled in the art.

Operational and functional aspects of the invention will now be described with reference to some example embodiments such as those illustrated in FIGS. 1 to 3.

As mentioned above, one important function of the invention is to allow the user to manage incoming calls via device 102, worn on the wrist in some example embodiments. For example, when there is an incoming call the phone 104 sends an incoming call signal via Bluetooth to device 102. The device 102 will then vibrate (or use some other signaling method) to notify the user that there is an incoming call. The device 102 displays the name of the caller (if available), or else the device 102 displays the number of the incoming call. If the number of the incoming call is not available, the display reads "Private Number" (or "Number Unavailable"). The user can then decide how to manage the incoming call. In embodiments, the user can take the following actions in response to an incoming call.

One action the user can take is to select the "Please Hold On" option. In this option, device 102 sends a command to phone 104 to go off-hook (answer the call) and device 102 then plays a prerecorded message such as "This is [name]. I'll be on the call in just a moment. Please don't hang up." A possible feature is to have the caller hear music (or some other audio) while the user is looking for her phone—i.e. not have the line go silent after the outgoing message. When the user finds her phone, she can then push the "Talk" or similar button to transfer the call to the phone 104 and talk normally.

Another action the user can take is to select the "I'll Call You Back" option. In this option, device 102 causes the phone 104 to answer the call and play a pre-recorded message to the caller (such as "I'm busy now. I'll call you back as soon as possible"), and then hang up. When this option is selected, the caller cannot leave a voice mail message. This is a diverted call. In embodiments, the user can record and select from more than one "I'll call you back" messages, such as "I'm in a meeting" or "I'm driving now" or "Hi Mom, I'll call you back as soon as I can".

Another action the user can take is to select the "Voice Mail" option. When this option is selected, device 102 causes the call to be immediately sent to voice mail.

Another possible response to an incoming voice call is to send a text response, selecting from a set of custom text messages that the user has provisioned the device with.

In addition to managing incoming calls, other functions performed by device 102 to interact with and/or manage phone 104 can include one or more of the following.

Phone finder: The user can cause the device 102 to trigger the phone 104 to ring, to assist the user in locating the phone, assuming the device 102 and phone 104 are within Bluetooth range of one another.

Silence ringer: The user can cause device 102 display to send a command to silence the ringer of the phone 104. It should be noted that in other embodiments, the user can be allowed to adjust ringer volume rather than just silence the ringer.

Low battery warning (phone): When the battery is getting low on the phone 104, notify user by vibrating and/or by a "Low Battery" message or indicator on the display of device 102.

Notification of incoming text messages: When the phone 104 receives a text message, the device 102 displays the identity of the sender and/or all or a portion of the message.

Send text back: The user can send a quick reply to incoming text messages via device 102. For example, the user can flick through a sequence of canned replies and then tap on the display to send the desired reply.

"You're leaving your phone behind": Use Bluetooth RSSI information to warn the user when she is leaving her phone 104 behind. If Bluetooth signal strength drops below a specified threshold, the device 102 will warn the user.

Low battery warning (device): When the battery is getting low on the device 102, notify user by vibrating and/or by a message on the display. In embodiments, at "very low battery" stage, the Bluetooth radio is shut off, the electronic system goes into low power mode, and the display changes to time only with a black background. This will keep power consumption to a minimum. In one embodiment, at "critically low battery" stage, the device 102 will automatically shut down.

Manage diverted calls: The device 102 keeps a list (names, phone numbers and time/date) of diverted calls. In embodiments, the user can flick through the list of diverted calls and do one or more of the following: Return the call by tapping on the display; Delete the call record from the list; and Do nothing (leave the call record on the list).

Privacy mode: In a business meeting, the user might not want others around her to be able to see the name of the calling party. In such situations, the user can turn on "privacy mode" and only the phone number of the incoming call is displayed.

Display company name: When there is an incoming call, if the company name of the calling party is available in the phone's address book (in addition to or in lieu of the name of the calling party), then display the name and company name in addition to or in lieu of the calling party's personal name.

Airplane Mode: When the user initiates airplane mode, the BT radio is turned off completely. In embodiments, when the device 102 is in airplane mode, a picture of an airplane is displayed in the background of the time display as a reminder to the user that this mode is on.

Phone event notification: If there are phone 104 events such as appointment reminders or alarms, the device 102 will notify the user by vibrating and by displaying an indicator of the event (e.g. could display "Alarm" or "Appointment reminder").

The attached flowcharts will now be described in connection with certain of the functions mentioned above. Those skilled in the art will understand how to implement these and other functions after being taught by these examples.

Figure 4:
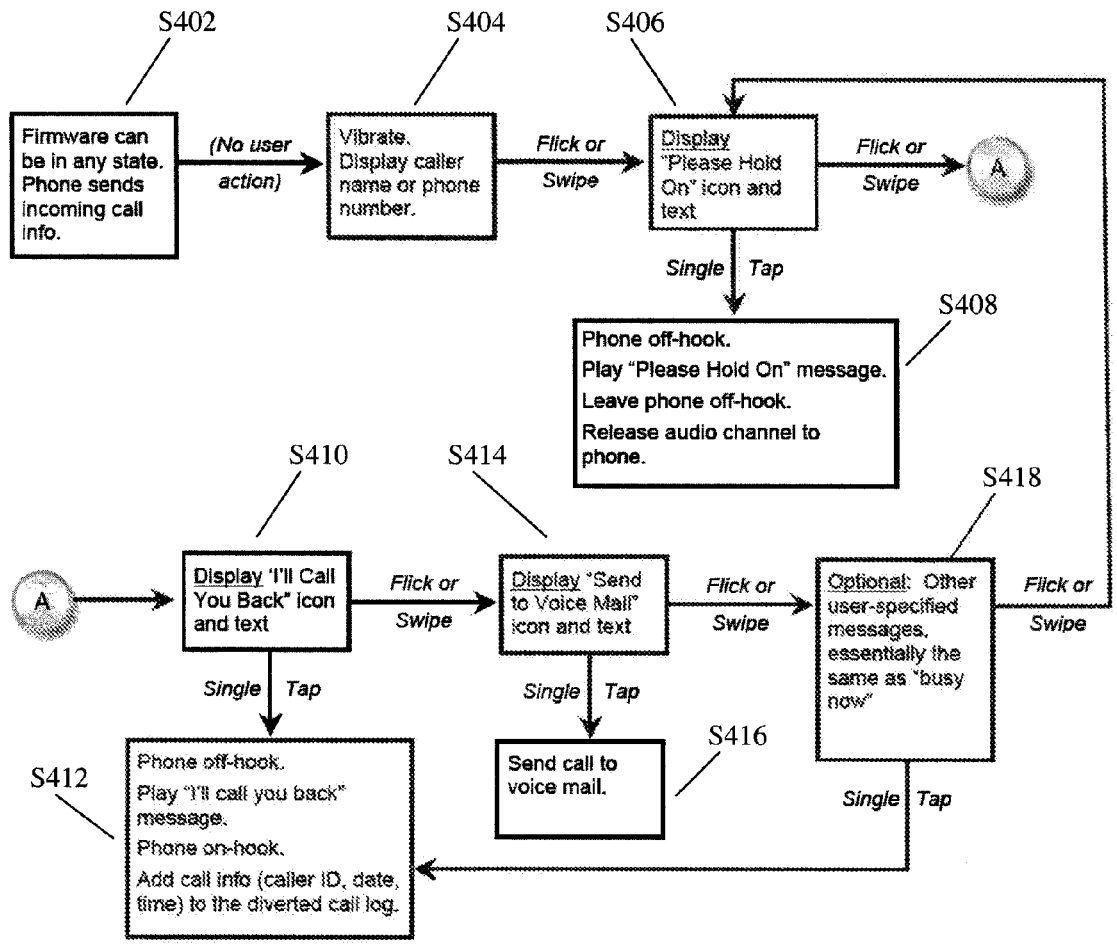
FIG. 4 is a sequence diagram illustrating an example remote management operation of the invention in connection with an incoming phone call.

FIG. 4 is a flowchart describing an example sequence that device 102 can follow in connection with an incoming call received on phone 104.

As shown in FIG. 4, in step S402, regardless of device state, whenever information about an incoming call is sent from phone 104 to device 102, the vibrator is actuated in step S404 and the number and/or name of the caller is displayed. When the user flicks her wrist or swipes the touchscreen, processing advances to step S406 where the first management option is displayed. In this example, the first option is to tell the caller to wait while the user looks for her phone. If this option is selected (e.g. user taps the touchscreen), in step S408, the phone 104 is taken off-hook, and a "Please Hold On" or other similar and/or customized message is played from device 102 to phone 104. If the user flicks or swipes the device, a next option is presented in S410, for example to display an "I'll Call You Back" icon and/or text. If this option is selected, processing advances to step S412, where the phone 104 is taken off-hook, and an "I'll Call You Back" or other similar and/or customized message is played from device 102 to phone 104. Then the phone 104 is placed on-hook (i.e. hang up). In embodiments, the call information is added to a diverted call log. If the preceding option is skipped by the user flicking or swiping the device, a next option is presented in step S414. In this example, a "Send to Voice Mail" icon and/or text is displayed. If this option is selected, processing advances to step S416, where the phone 104 is caused to immediately send the call to voice mail. In embodiments, the call information is added to a diverted call log. If the preceding option is skipped by the user flicking or swiping the device, a next option is presented in step S418. In this example, it is possible for other user-specified messages to be selected to be played before processing advances to step S412. Otherwise, if this option is not selected in step S418, the options are re-presented in a loop by returning back to S406. Additionally or alternatively, the user can do nothing, and the phone will just ring until the call goes to voice mail or the caller hangs up. Another possible option to present to the user is to silence the ringer. For example, the user might be in a meeting and the phone rings—the user forgot to turn off the ringer. The user could silence the ringer from the device 102. In a preferred embodiment, if the user silences the ringer during an incoming call, the device still presents options to the user to manage the call—i.e. to take the call off hook and play a message, etc.

It should be noted that there can be exceptions to the first step in which a device is in any state. For example, if the device has established a connection for provisioning or for a firmware upgrade, then it will ignore incoming call notifications. Moreover, in alternative embodiments, the user doesn't have to do a wrist flick or a swipe to get to the first option/action. The first action can be presented to the user along with the information about whom the call is from.

In one embodiment, if the user sends the call to voice mail, call data will note be added to the diverted call log. This is because the caller had an opportunity to leave a voice message. (And that call will be stored in the phone's call log.) In this embodiment, device 102 preferably only maintains a list of calls that were truly "diverted" (e.g. the caller was told that the user will call him/her back, and didn't give the caller an opportunity to leave a voice message.) According to some aspects, these are the critical calls to keep track of, because the user promised a call back and didn't let the caller leave a message. In an alternate embodiment a record of voice mail calls could also be kept in a diverted call queue (e.g. maintained by event manager 204 in FIG. 2).

In embodiments, event manager 204 maintains an event queue for acting on certain events such as incoming calls and messages by queuing them and managing them according to programmable means. However, in such embodiments an incoming call is a preemptive event—it does not go into an event queue. In other words, an incoming call is preferably presented immediately to the user regardless of whether event manager 204 maintains an event queue. After the user selects her option for handling the call, device 102 returns to its previous state (before incoming call). In embodiments, if the user does not select any of the options, then the call will go to voice mail by default. (I.e. the phone will just keep ringing until it goes to voice mail.) The option to send the call to voice mail allows the user to silence ringing and send to voice mail immediately. If the user selects no option after a threshold number of seconds, then device 102 returns its previous state (before the incoming call). In this case, the call will just go to voice mail by default (or the caller will hang up). The sequence of options shown in this flow chart is for illustration only. In addition to or alternatively to the options mentioned above, possible responses to an incoming call can include: "Silence Ringer"—some users might want to make this one of the first options that appears; and "Stop Calling Me!".

In embodiments, an additional or alternative feature is to obtain a company name of a caller from phone's address book (if available) and display that along with or in lieu of a caller's name for incoming calls. Moreover, in addition to displaying a name or number of the caller, device 102 can display a photo or avatar the user has associated with such number or caller.

Figure 5:
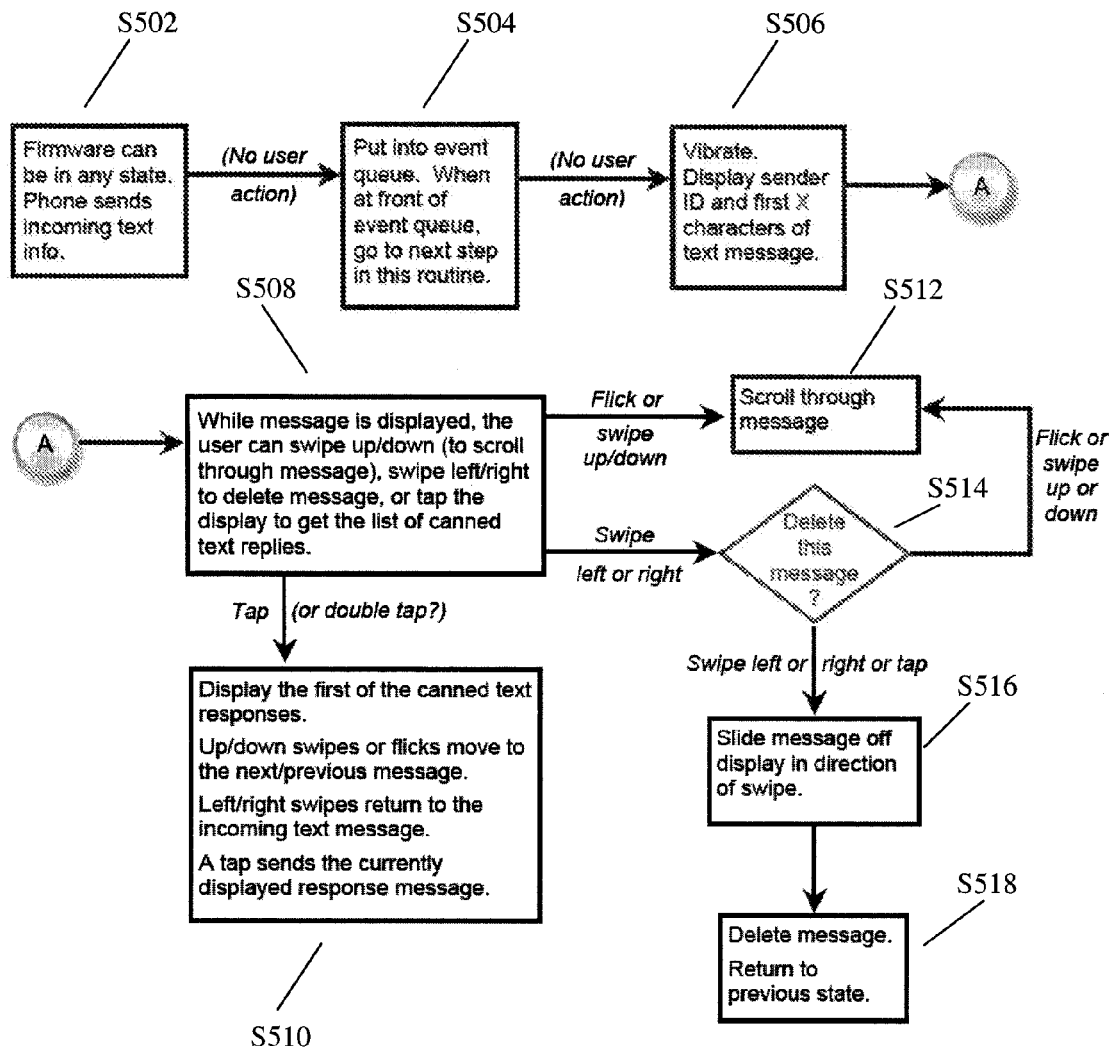
FIG. 5 is a sequence diagram illustrating an example remote management operation of the invention in connection with an incoming text message.

FIG. 5 is a flowchart describing an example sequence that device 102 can follow in connection with an incoming text message received on phone 104.

As shown in FIG. 5, in step S502, regardless of device state (except possibly as noted above in connection with FIG. 4), whenever information about an incoming text message is sent from phone 104 to device 102, the message is put into a queue in step S504. For the top or only event in the event queue, processing goes immediately to step S506, where the vibrator is actuated and the sender ID and/or first few characters of the message and/or the entire message are displayed. If there are events in the event queue ahead of the present text message, the text message will be processed according to the order in which it entered the queue. Processing then advances to S508 where functionality permits the entire contents of the message to be viewed. However, in some embodiments, the entire contents of the text message are not displayed on device 102, and the entire text message is only available for viewing on the phone.

An alternative embodiment is to send the entire text message to the device 102. In this example, several actions are allowed depending on how the user interacts with device 102. If the user taps on the touchscreen in step S508, a sequence of screens can be displayed with canned responses that can be sent in response to the message in step S510. The user flicks her wrist or swipes the touchscreen to view all the possible canned responses, and a tap on the touchscreen will cause the message to be sent from device 102 to phone 104 for responding to the sender. If the user swipes left to right on the touchscreen in step S508, processing advances to step S514 where the user is asked if the received message should be deleted. If the user swipes or taps the touchscreen, the received message will slide off the display in the direction of the left or right swipe in step S516 and will then be deleted from the queue in step S518.

Figure 6:
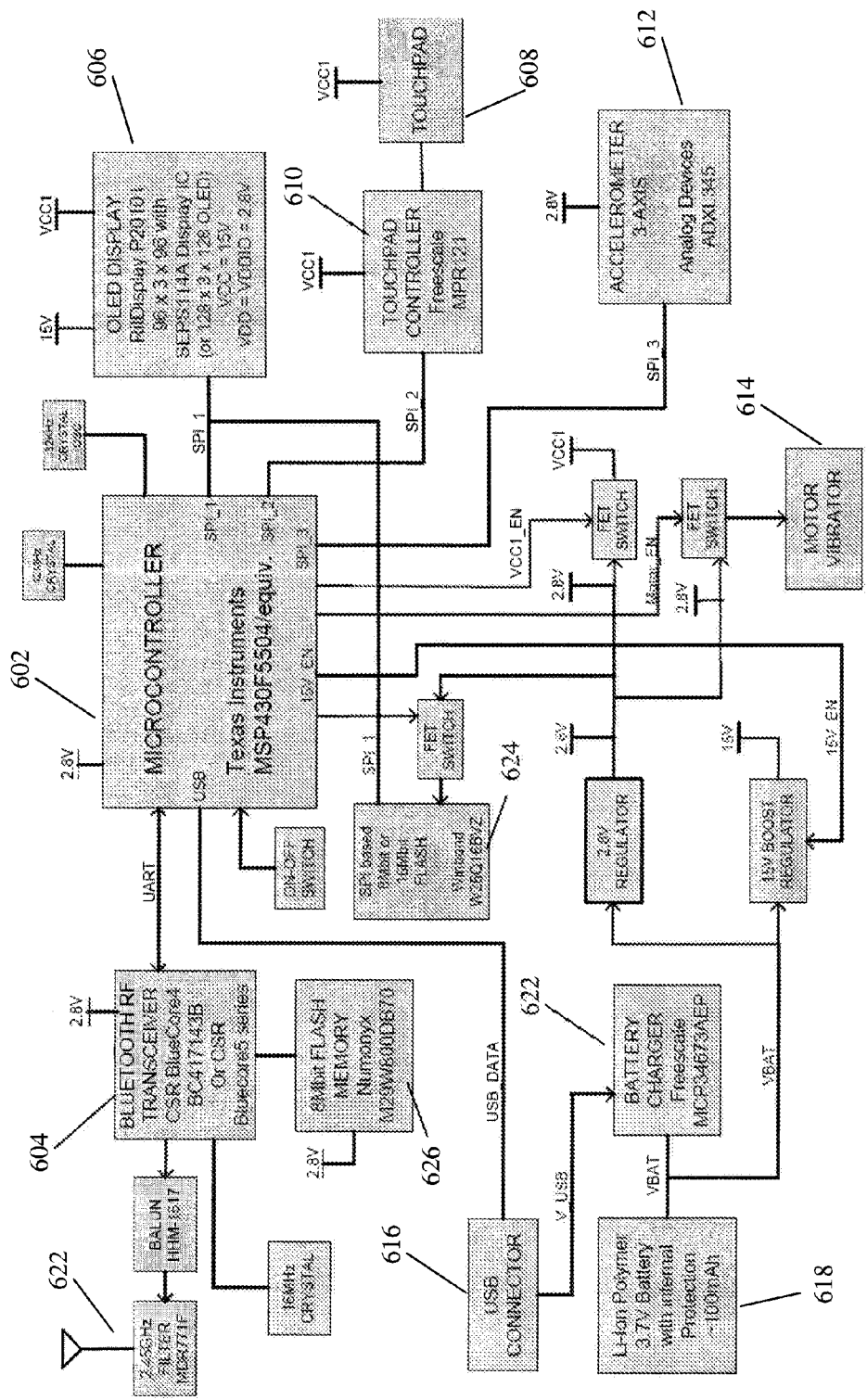
FIG. 6 is a schematic block diagram illustrating an example implementation of a remote phone management device according to embodiments of the invention.

There are many different ways to implement device 102. FIG. 6 is a schematic block diagram of one possible implementation of device 102.

As shown, the device includes a microcontroller 602 (e.g. a MSP430F5504 from Texas Instruments), a Bluetooth Transceiver 604 (e.g. CSR BlueCore5 from CSR), an OLED Display 606 (e.g. P20101 from RitDisplay with a SEPS114A Display Control IC from Syncoam) a touch pad 608 and touchpad controller 610 (e.g. MPR121 from Freescale), a 3-Axis Accelerometer 612 (e.g. an ADXL345 from Analog Devices), a motor vibrator 614, a USB connector 616, a Li—On Polymer battery 618 and battery charger 620 (e.g. a MCP34673AEP from Freescale), and an antenna 622

As shown in FIG. 6, microcontroller 602 and Bluetooth transceiver 604 include associated memories 624 and 626, respectively, for storing data and code. In one possible non-limiting example embodiment, with respect to elements shown in FIG. 2, phone communications manager 203 is implemented by code executing on transceiver 604 and stored in memory 626 and can include a Bluetooth stack provided by CSR. Event manager 204, battery manager 214, configuration/provisioning manager 222, and PC communication manager 224 are implemented by code executing on microcontroller 602 and stored in memory 624. Configurations 216, icons 218 and audio 220 are implemented as data structures in memory 624 and managed by microcontroller 602.

It should be apparent to those skilled in the art that it may be possible in some embodiments for some or all of the functionality of any combination of microcontroller 602, Bluetooth transceiver 604, and touchpad controller 610 to be implemented in a single chip (e.g. a single controller chip or ASIC).

In embodiments, a pushbutton at the location of a traditional watch stem will perform hard power on/off.

As shown in FIG. 6, battery charging is performed through USB connection. In some embodiments, the watch will have a non-standard USB connector and an external device. In one example, the external device is implemented by a charging cradle (for home use) and a travel charger (smaller than the charging cradle for home use), with both making electrical contact with electrical contacts exposed and/or provided on device 102. There can then be a standard USB connector on the charging cradle. A standard USB cable can be plugged into the connector to make connection with a USB port on a PC or with a power supply to charge the batteries. The travel charger will have the same functions as the charging cradle (i.e. it will make a USB connection with the contacts on the back of device 102), but it will be smaller than the charging cradle. It can be designed to clip onto the watch, possibly using a spring-loaded hinge mechanism. One possible design is to have the travel charger clip into the charging cradle, so the user can use the charging cradle at home, and can unclip the travel charger and take it with her when she travels.

As an alternative to the above described battery charging, inductive charging could be used to charge the device 102. This implementation does not require a direct connection, and therefore, would not require a receptacle on the device. In embodiments, inductive charging is selected to eliminate the need for a physical charging connector on the device.

In the embodiment of FIG. 6, most or all of the components are contained in a single watch case, constructed of a frame that holds all other components. A portion of the case also serves as the frame in which any buttons and the antenna 622 are installed. The bottom of the watchcase could be constructed of ceramic or plastic (rather than metal). A plastic or ceramic enclosure could extend the range of device 102 by eliminating obstructions to the field of the antenna 622. In a preferred implementation, device 102 has a metal caseback (the watch industry term for the bottom of the watchcase) because the metal bottom plate provides a ground path to the user's body which is important for ESD protection, even if every other part of the case is plastic.

Figure 7A:
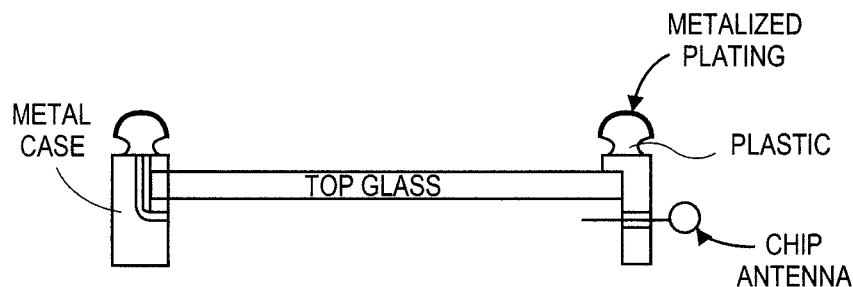
FIGS. 7A to 7C illustrate example implementations of an antenna for use in a remote phone management device to communicate with a cell phone according to embodiments of the invention.
Figure 7B:
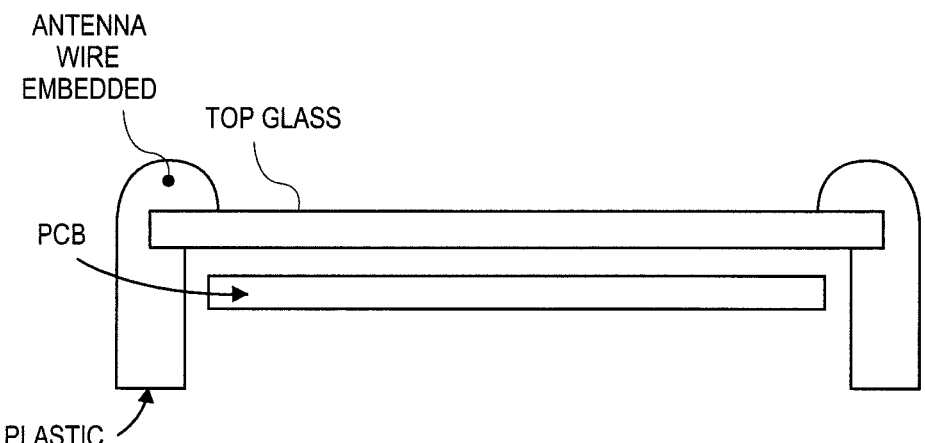
Figure 7C:
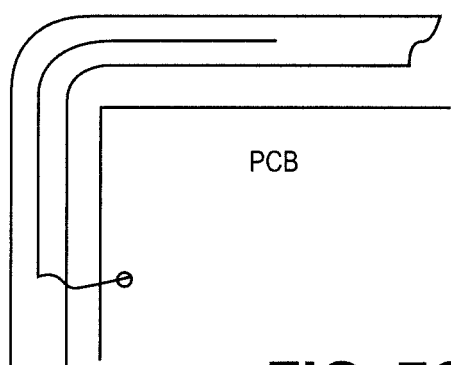

FIGS. 7A to 7C illustrate possible ways antenna 622 can be incorporated into a case for device 102.

In FIG. 7A, the case 702 holding the display and all components is comprised of metal and a plastic bezel 704 is provided on the top perimeter of the case. Metallized plating 706 that forms a loop antenna 622 is provided on the top of the plastic bezel. FIG. 7A also illustrates a second possible embodiment of antenna design, with an antenna embedded in a watch stem 708.

In FIG. 7B, with a top corresponding view in FIG. 7C, the case 710 holding the glass display and the components is comprised of plastic, and a metal wire 712 that forms a monopole and/or loop antenna 622 is embedded in the plastic.

In other embodiments not shown in FIGS. 7A to 7C, a standard chip antenna is used. For example, it is possible to print a trace antenna on the PCB on which other components comprising device 102 are mounted. Alternatively, it is possible to run an antenna wire outside of the watchcase that is embedded in or part of the watch band. It is also possible to use a metalized plating (for example on an upper/outer surface of the watchcase) as an antenna.

Figure 8A:
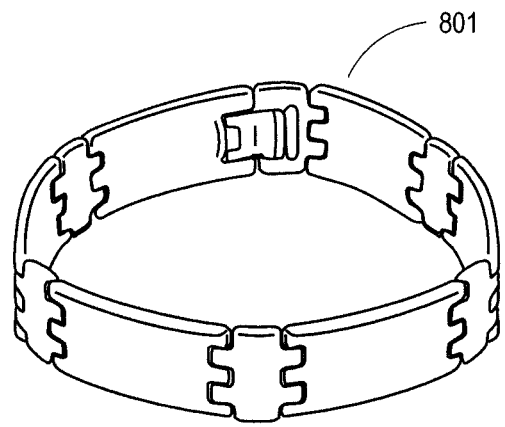
FIGS. 8A and 8B illustrate a wrist mounted device in a bracelet form factor as an alternate embodiment.
Figure 8B:
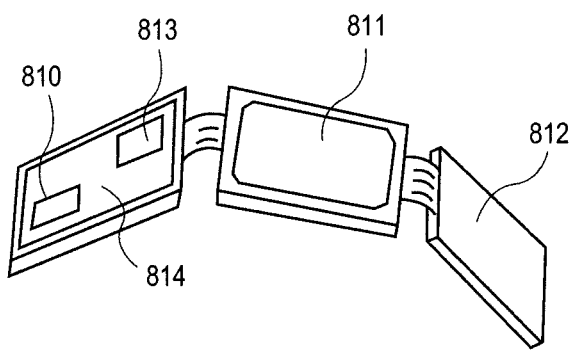

FIGS. 8A and 8B show a possible embodiment of device 102 depicted in the form factor of a bracelet 801. In this embodiment, similar components are found as that in the preferred embodiment in FIGS. 2 and 6. However, in the interest of reducing the overall stack (thickness) of the remote phone manager hardware, this embodiment allows for the distribution of the same elements in FIGS. 2 and 6 among several of the links. As such, the printed circuit board 814 would be divided into multiple instances. One printed circuit board comprises the Bluetooth radio integrated circuit 810 and power management circuit 813. An additional printed circuit board would be included for mounting the display device 811 and underneath 811 would be a likely location of the display controller. The link 812 would be a likely location for the battery and charging coil. This dividing of the components can continue as needed to achieve the thickness of the overall bracelet links as required. However, the majority of components as depicted in FIGS. 2 and 6 are included to implement the remote phone manager function.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A device comprising:
   a device package that is separate and remote from an associated cellular phone; and
   a controller provided within the package for interacting with the associated cellular phone via a phone communication module to allow a user to manage at least incoming calls to the cellular phone using one or more user interface components provided within the package to interact with the user, the user interface components including one or more of a vibrating incoming call indicator, a display, a touch screen, and an accelerometer,
   wherein the controller is adapted to notify the user if the associated cellular phone is nearing a limit of a communication range between the device package and the cellular phone.

2. A device according to claim 1, wherein the phone communication module comprises a Bluetooth transmitter and receiver.

3. A device according to claim 1, wherein the controller displays a caller's name associated with the incoming call.

4. A device according to claim 1, wherein the controller answers the incoming call and plays a pre-recorded message to an associated caller.

5. A device according to claim 4, wherein the controller automatically keeps the call off-hook or automatically hangs up after the pre-recorded message is played depending on a selection action by the user via the user interface components.

6. A device according to claim 1, wherein the controller detects one or more wrist flicks from the user via the accelerometer, the wrist flicks being used to manage the incoming call.

7. A device according to claim 4, further comprising a memory for storing a plurality of the pre-recorded messages, wherein the controller further allows the pre-recorded messages to be downloaded to the memory from an external source.

8. A device according to claim 4, wherein certain of the pre-recorded messages are in the user's voice.

9. A device according to claim 1, further comprising a memory to store icons and/or text that the controller can display on the display to provide information to the user about options for managing or responding to the incoming call.

10. A device according to claim 9, wherein the controller allows for customized icons and text for managing possible responses to the incoming call to be downloaded to the memory from an external source.

11. A device according to claim 9, wherein the controller further allows for customizations in the order in which possible responses to calls are presented to the user to be downloaded to the memory from an external source.

12. A device according to claim 1, wherein the controller send the incoming call directly to voicemail.

13. A device according to claim 12, wherein the incoming call is sent to voicemail after a predetermined time with no user interaction.

14. A device according to claim 12, wherein the incoming call is sent to voicemail in response to a selection action by the user via the user interface components.

15. A device according to claim 1, wherein the controller further to allow a user to manage incoming text messages to the cellular phone using the one or more user interface components provided within the case to interact with the user.

16. A device according to claim 15, wherein the controller causes the display to show an identity of a sender associated with the incoming text message.

17. A device according to claim 15, wherein the controller causes the display to show some or all characters of the incoming text message.

18. A device according to claim 15, wherein the controller sends a predefined text message in response to a user selection via the user interface components.

19. A device according to claim 18, further comprising a memory for storing a plurality of the predefined text messages, wherein the controller allows for the pre-recorded text messages to be downloaded to the memory from an external device.

20. A device according to claim 1, wherein the controller is adapted to cause the associated cellular phone to ring.

21. A device according to claim 1, wherein the controller is adapted to cause the associated cellular phone's ringer to be silenced or adjusted in ring volume.

22. A device according to claim 1, wherein the controller is adapted to notify the user of one or both of low battery in the associated cellular phone or low battery in the device package.

23. A device according to claim 1, wherein the device package comprises a watch-like case.

24. A device according to claim 1, wherein the device package comprises one or more links in a bracelet.

25. A device according to claim 1, wherein the controller uses the detected wrist flicks to sequence through display of available options for managing the incoming call.

* * * * *